United States Patent
Takahashi et al.

(10) Patent No.: US 10,005,981 B2
(45) Date of Patent: Jun. 26, 2018

(54) REFRIGERATOR OIL, AND WORKING FLUID COMPOSITION FOR REFRIGERATORS

(71) Applicant: JXTG Nippon Oil & Energy Corporation, Tokyo (JP)

(72) Inventors: Hitoshi Takahashi, Tokyo (JP); Ken Sawada, Tokyo (JP); Akira Tada, Tokyo (JP); Souichirou Konno, Tokyo (JP)

(73) Assignee: JXTG Nippon Oil & Energy Corporation, Tokyo (JP)

( * ) Notice: Subject to any disclaimer, the term of this patent is extended or adjusted under 35 U.S.C. 154(b) by 6 days.

(21) Appl. No.: 15/025,855

(22) PCT Filed: Sep. 30, 2014

(86) PCT No.: PCT/JP2014/076163
§ 371 (c)(1),
(2) Date: Mar. 29, 2016

(87) PCT Pub. No.: WO2015/050137
PCT Pub. Date: Apr. 9, 2015

(65) Prior Publication Data
US 2016/0244691 A1 Aug. 25, 2016

(30) Foreign Application Priority Data
Oct. 2, 2013 (JP) .................... 2013-207306

(51) Int. Cl.
*C09K 5/04* (2006.01)
*C10M 171/00* (2006.01)
(Continued)

(52) U.S. Cl.
CPC ......... *C10M 171/008* (2013.01); *C08L 71/02* (2013.01); *C09K 5/045* (2013.01);
(Continued)

(58) Field of Classification Search
CPC ................ C08L 71/02; C10M 107/34; C10M 2209/1033
See application file for complete search history.

(56) References Cited

U.S. PATENT DOCUMENTS

2010/0108936 A1* 5/2010 Kaneko ............... C10M 169/04
252/68
2010/0175421 A1* 7/2010 Kaneko ................. C09K 5/045
62/468
(Continued)

FOREIGN PATENT DOCUMENTS

CN 101827921 A 9/2010
EP 0989180 A1 3/2000
(Continued)

OTHER PUBLICATIONS

Korean Intellectual Property Office, Notice of Allowance in Korean Application No. 10-2016-7009754 (dated Aug. 3, 2016).
(Continued)

*Primary Examiner* — John R Hardee
(74) *Attorney, Agent, or Firm* — Leydig, Voit & Mayer, Ltd.

(57) ABSTRACT

The refrigerating machine oil according to the present invention comprises a polyalkylene glycol represented by the following formula (1):

$$R^1-(OR^3)_n-OR^2 \qquad (1)$$

[$R^1$ and $R^2$ may be the same or different from each other and each represent a hydrogen atom, an alkyl group having from 1 to 5 carbon atoms, or an acyl group having from 2 to 5 carbon atoms, $R^3$ represents an alkylene group having from 2 to 4 carbon atoms, n represents an integer such that a number average molecular weight of the polyalkylene glycol represented by the formula (1) is from 1000 to 2500]
(Continued)

the polyalkylene glycol having a ratio of the weight average molecular weight Mw to the number average molecular weight Mn, Mw/Mn, of from 1.00 to 1.15, the refrigerating machine oil being used with a mildly flammable hydrofluorocarbon refrigerant.

4 Claims, 1 Drawing Sheet

(51) Int. Cl.
  *C08L 71/02* (2006.01)
  *C10M 107/34* (2006.01)
  *C10N 40/30* (2006.01)
(52) U.S. Cl.
  CPC ..... *C10M 107/34* (2013.01); *C09K 2205/126* (2013.01); *C10M 2209/1033* (2013.01); *C10M 2209/1045* (2013.01); *C10M 2209/1055* (2013.01); *C10M 2209/1065* (2013.01); *C10M 2209/1075* (2013.01); *C10M 2209/1085* (2013.01); *C10N 2040/30* (2013.01); *C10N 2220/021* (2013.01); *C10N 2220/302* (2013.01); *C10N 2230/08* (2013.01); *C10N 2240/30* (2013.01)

(56) References Cited

U.S. PATENT DOCUMENTS

| 2012/0132848 | A1* | 5/2012 | Sawada | C09K 5/045 252/68 |
|---|---|---|---|---|
| 2012/0228541 | A1* | 9/2012 | Takigawa | C09K 5/045 252/68 |

FOREIGN PATENT DOCUMENTS

| EP | 2233553 A1 | 9/2010 |
|---|---|---|
| JP | H2-084491 A | 3/1990 |
| JP | H2-242888 A | 9/1990 |
| JP | H3-200895 A | 9/1991 |
| JP | H3-217495 A | 9/1991 |
| JP | H6-128578 A | 5/1994 |
| JP | H10-001689 A | 1/1998 |
| JP | 2001-262169 A | 9/2001 |
| JP | 2002-180074 A | 6/2002 |
| JP | 2002-180075 A | 6/2002 |
| JP | 2002-194368 A | 7/2002 |
| JP | 2004-260123 A | 9/2004 |
| JP | 2007-510039 A | 4/2007 |
| JP | 2008-115266 A | 5/2008 |
| JP | 2010-065191 A | 3/2010 |
| JP | 2011-246587 A | 12/2011 |
| JP | 2012-513527 A | 6/2012 |
| JP | 2012-131994 A | 7/2012 |
| JP | 2012-251170 A | 12/2012 |
| JP | 2013-014672 A | 1/2013 |
| JP | 2013-014673 A | 1/2013 |
| KR | 10-2006-0035803 A | 4/2006 |
| KR | 10-2006-0086809 A | 8/2006 |
| KR | 10-2007-0015530 A | 2/2007 |
| KR | 10-2002-0052175 A | 5/2007 |
| WO | WO 2007/105718 A1 | 9/2007 |
| WO | WO 2008/153106 A1 | 12/2008 |
| WO | WO 2009/057475 A1 | 5/2009 |
| WO | WO 2013/005647 A1 | 1/2013 |

OTHER PUBLICATIONS

European Patent Office, Extended European Search Report in European Patent Application No. 14850361.8 (Date of dispatch Jul. 28, 2016).
State Intellectual Property Office of the People's Republic of China, Office Action issued in Chinese Application No. 201480054294.4 (dated Jun. 1, 2017).
International Search Report, dated Dec. 22, 2014 in International Application No. PCT/JP2014/076163.
International Preliminary Report on Patentability, dated Apr. 14, 2016 in International Application No. PCT/JP2014/076163.
Written Opinion, dated Dec. 22, 2014 in International Application No. PCT/JP2014/076163.
Office Action, dated Sep. 9, 2014 in Japanese Application No. 2014-152216.
U.S. Appl. No. 15/113,138, filed Jul. 21, 2016.
U.S. Appl. No. 15/114,290, filed Jul. 26, 2016.
U.S. Appl. No. 15/116,110, filed Aug. 2, 2016.
U.S. Appl. No. 15/304,775, filed Oct. 17, 2016.
U.S. Appl. No. 15/305,568, filed Oct. 20, 2016.
U.S. Appl. No. 15/310,398, filed Nov. 10, 2016.

* cited by examiner

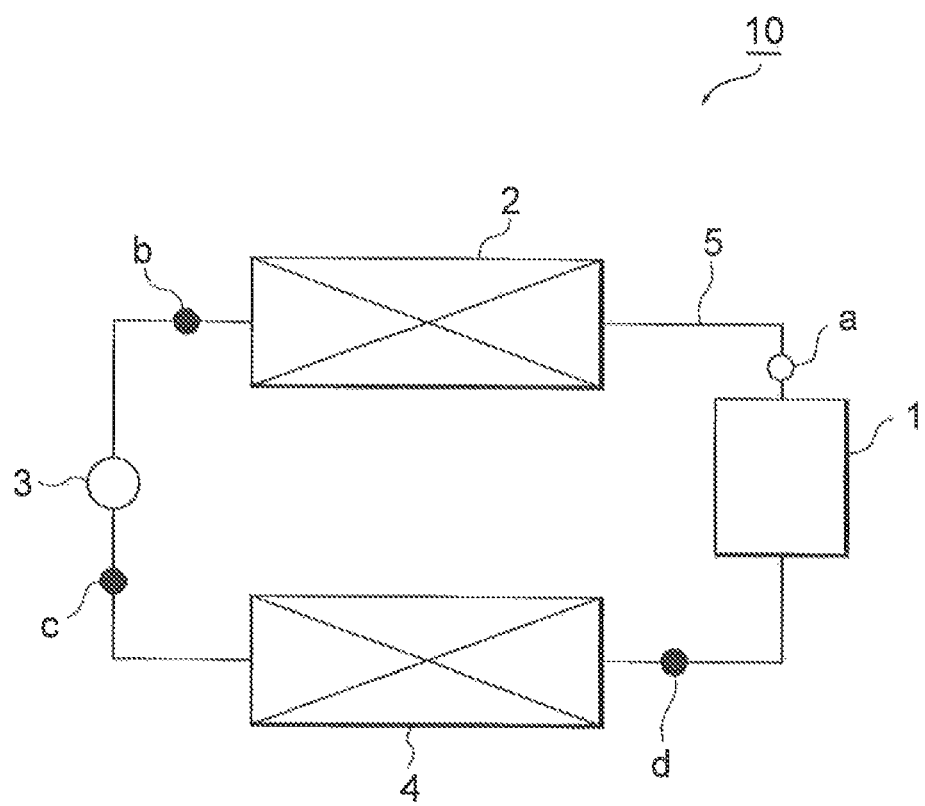

REFRIGERATOR OIL, AND WORKING FLUID COMPOSITION FOR REFRIGERATORS

CROSS-REFERENCE TO RELATED APPLICATIONS

This patent application is the U.S. national phase of International Application No. PCT/JP2014/076163, filed on Sep. 30, 2014, which claims the benefit of Japanese Patent Application No. 2013-207306, filed Oct. 2, 2013, the disclosures of which are incorporated herein by reference in their entireties for all purposes.

TECHNICAL FIELD

The present invention relates to a refrigerating machine oil, a working fluid composition for a refrigerating machine, use of a composition containing polyalkylene glycol as a refrigerating machine oil for a mildly flammable hydrofluorocarbon refrigerant or a working fluid composition for a refrigerating machine containing a mildly flammable hydrofluorocarbon refrigerant, and application of polyalkylene glycol for producing a refrigerating machine oil for a mildly flammable hydrofluorocarbon refrigerant or a working fluid composition for a refrigerating machine containing a mildly flammable hydrofluorocarbon refrigerant, a method for flame-retarding a refrigerating machine.

BACKGROUND ART

CFCs (chlorofluorocarbons) and HCFCs (hydrochlorofluorocarbons), which have been conventionally used as refrigerants for refrigeration equipment, have become objects of regulations due to the problem of recent ozone layer depletion, and HFCs (hydrofluorocarbons) are used as refrigerants instead of them.

In the case where a CFC or HCFC is as a refrigerant, hydrocarbon oils such as mineral oil and alkylbenzenes have been used suitably as a refrigerating machine oil. However, depending the type of the coexistent refrigerant, the refrigerating machine oil may exhibit unpredictable behavior, such as compatibility with the refrigerant, lubricity, solution viscosity with the refrigerant, and thermal and chemical stability, and therefore the refrigerating machine oil needs to be developed for each refrigerant. Thus, as refrigerating machine oils for an HFC refrigerant, for example, polyalkylene glycol (see Patent Literature 1), ester (see Patent Literature 2), carbonic acid ester (see Patent Literature 3), and polyvinyl ether (see Patent Literature 4) have been developed.

CITATION LIST

Patent Literature

Patent Literature 1: Japanese unexamined Patent Publication No. H02-242888
Patent Literature 2: Japanese unexamined Patent Publication No. H03-200895
Patent Literature 3: Japanese unexamined Patent Publication No. H03-217495
Patent Literature 4: Japanese unexamined Patent Publication No. H06-128578

SUMMARY OF INVENTION

Technical Problem

It is an object of the present invention to provide a refrigerating machine oil of which safety has been enhanced from the viewpoint of flame retardancy and a working fluid composition for a refrigerating machine containing the refrigerating machine oil.

Solution to Problem

To solve the above problem, the present invention provides a refrigerating machine oil comprising a polyalkylene glycol represented by the following formula (1):

$$R^1-(OR^3)_n-OR^2 \qquad (1)$$

[$R^1$ and $R^2$ may be the same or different from each other and each represent a hydrogen atom, an alkyl group having from 1 to 5 carbon atoms, or an acyl group having from 2 to 5 carbon atoms, $R^3$ represents an alkylene group having from 2 to 4 carbon atoms, n represents an integer such that a number average molecular weight of the polyalkylene glycol represented by the formula (1) is from 1000 to 2500]

the polyalkylene glycol having a ratio of the weight average molecular weight Mw to the number average molecular weight Mn, Mw/Mn, of from 1.00 to 1.15, the refrigerating machine oil being used with a mildly flammable hydrofluorocarbon refrigerant.

In the polyalkylene glycol represented by the formula (1), it is preferred that the ratio of an ethylene group in the alkylene groups represented by $R^3$ is 40 mol % or less.

Also, the present invention provides a working fluid composition for a refrigerating machine which comprises the above refrigerating machine oil and a mildly flammable hydrofluorocarbon refrigerant.

In the present invention, the mildly flammable hydrofluorocarbon refrigerant may contain at least one selected from the group consisting of 1,3,3,3-tetrafluoropropene and 2,3,3,3-tetrafluoropropene.

It may also be said that the present invention is use of a composition for a refrigerating machine oil or a working fluid composition for a refrigerating machine, the composition comprising a polyalkylene glycol represented by the following formula (1):

$$R^1-(OR^3)_n-OR^2 \qquad (1)$$

[$R^1$ and $R^2$ may be the same or different from each other and each represent a hydrogen atom, an alkyl group having from 1 to 5 carbon atoms, or an acyl group having from 2 to 5 carbon atoms, $R^3$ represents an alkylene group having from 2 to 4 carbon atoms, n represents an integer such that a number average molecular weight of the polyalkylene glycol represented by the formula (1) is from 1000 to 2500]

the polyalkylene glycol having a ratio of a weight average molecular weight Mw to the number average molecular weight Mn, Mw/Mn, of from 1.00 to 1.15, the refrigerating machine oil being used with a mildly flammable hydrofluorocarbon refrigerant, the working fluid composition comprising a mildly flammable hydrofluorocarbon refrigerant.

It may also be said that the present invention is use of a polyalkylene glycol for manufacturing a refrigerating machine oil or a working fluid composition for a refrigerating machine, the polyalkylene glycol being represented by the following formula (1):

$$R^1-(OR^3)_n-OR^2 \qquad (1)$$

[R¹ and R² may be the same or different from each other and each represent a hydrogen atom, an alkyl group having from 1 to 5 carbon atoms, or an acyl group having from 2 to 5 carbon atoms, R³ represents an alkylene group having from 2 to 4 carbon atoms, n represents an integer such that a number average molecular weight of the polyalkylene glycol represented by the formula (1) is from 1000 to 2500]

the polyalkylene glycol having a ratio of a weight average molecular weight Mw to the number average molecular weight Mn, Mw/Mn, of from 1.00 to 1.15, the refrigerating machine oil being used with a mildly flammable hydrofluorocarbon refrigerant the working fluid composition comprising a mildly flammable hydrofluorocarbon refrigerant.

The present invention also provides a method for flame-retarding a refrigerating machine with a mildly flammable hydrofluorocarbon refrigerant, the method comprising flame-retarding the refrigerating machine by using a composition as a refrigerating machine oil, the composition comprising a polyalkylene glycol represented by the following formula (1):

$$R^1-(OR^3)_n-OR^2 \quad (1)$$

[R¹ and R² may be the same or different from each other and each represent a hydrogen atom, an alkyl group having from 1 to 5 carbon atoms, or an acyl group having from 2 to 5 carbon atoms, R³ represents an alkylene group having from 2 to 4 carbon atoms, n represents an integer such that a number average molecular weight of the polyalkylene glycol represented by the formula (1) is from 1000 to 2500]

the polyalkylene glycol having a ratio of the weight average molecular weight Mw to the number average molecular weight Mn, Mw/Mn, of from 1.00 to 1.15.

Advantageous Effects of Invention

According to the present invention, it is possible to provide a refrigerating machine oil of which safety has been enhanced from the viewpoint of flame retardancy and a working fluid composition for a refrigerating machine containing the refrigerating machine oil.

BRIEF DESCRIPTION OF DRAWINGS

FIG. 1 is a schematic view showing an example of the configuration of a refrigerating machine.

DESCRIPTION OF EMBODIMENTS

Hereinafter, preferred embodiments of the present invention are described in detail.

A refrigerating machine oil according to the present embodiment comprises a polyalkylene glycol represented by the following formula (1):

$$R^1-(OR^3)_n-OR^2 \quad (1)$$

[R¹ and R² may be the same or different from each other and each represent a hydrogen atom, an alkyl group having from 1 to 5 carbon atoms, or an acyl group having from 2 to 5 carbon atoms, R³ represents an alkylene group having from 2 to 4 carbon atoms, n represents an integer such that a number average molecular weight of the polyalkylene glycol represented by the formula (1) is from 1000 to 2500] wherein the polyalkylene glycol has a ratio of the weight average molecular weight Mw to the number average molecular weight Mn, Mw/Mn, of from 1.00 to 1.15 (hereinafter, referred to as "the polyalkylene glycol according to the present embodiment"), and wherein the refrigerating machine oil is used with a mildly flammable hydrofluorocarbon refrigerant. A working fluid composition for a refrigerating machine according to the present embodiment comprises a refrigerating machine oil which comprises a polyalkylene glycol represented by the formula (1), wherein the polyalkylene glycol has a ratio of the weight average molecular weight Mw to the number average molecular weight Mn, Mw/Mn, of from 1.00 to 1.15, and a mildly flammable hydrofluorocarbon refrigerant. The working fluid composition for a refrigerating machine according to the present embodiment includes an aspect comprising a refrigerating machine oil according to the present embodiment and a mildly flammable hydrofluorocarbon refrigerant.

In the above formula (1), R¹ and R² may be the same or different from each other and each represent a hydrogen atom, an alkyl group having from 1 to 5 carbon atoms, or an acyl group having from 2 to 5 carbon atoms. In the case where R¹ and R² are each an alkyl group or an acyl group, they may be a linear one or a branched one. Examples of such an alkyl group specifically include a methyl group, an ethyl group, a linear or branched propyl group, a linear or branched butyl group, and a linear or branched pentyl group and the like, and examples of the acyl group specifically include an acetyl group, a linear or branched propanoyl group, a linear or branched butanoyl group, and a linear or branched pentanoyl group and the like. Of these alkyl groups and acyl groups, from the point of the compatibility with the refrigerant, a methyl group, an ethyl group, a linear or branched propyl group, a linear or branched butyl group, an acetyl group, a linear or branched propanoyl group, a linear or branched butanoyl group is more preferred, a methyl group, an ethyl group, or an acetyl group is further preferred, and a methyl group or an acetyl group is most preferred. If the alkyl group or the acyl group has 5 or less carbon atoms, the composition range which exhibits compatibility to the refrigerant becomes wider, and it is possible to suppress lubrication defects of a refrigerant compressor and inhibition of heat exchange in an evaporator.

In the above formula (1), R³ represents an alkylene group having from 2 to 4 carbon atoms. Examples of such an alkylene group specifically include an ethylene group (—CH₂CH₂—), a propylene group (—CH(CH₃)CH₂—), a trimethylene group (—CH₂CH₂CH₂—), a butylene group (—CH(CH₂CH₃)CH₂—), and a tetramethylene group (—CH₂CH₂CH₂CH₂—). Of these alkylene groups, an ethylene group, a propylene group, a butylene group, and a tetramethylene group are more preferred. The ratio of the alkylene group having 2 carbon atoms (that is, an ethylene group) in the alkylene groups represented by R³ is preferably 40 mol % or less, more preferably 30 mol % or less, further preferably 25 mol % or less, and most preferably 20 mol % or less. The case where the ratio of the alkylene group having 2 carbon atoms (ethylene group) is 40 mol % or less is preferred because the refrigerant compatibility is excellent.

The number average molecular weight (Mn) of the polyalkylene glycol according to the present embodiment can be, for example, from 500 to 3000, and can be from 600 to 2000 and can be from 600 to 1500. The number average molecular weight (Mn) of the polyalkylene glycol according to the present embodiment is preferably from 1500 to 2500, more preferably from 1510 to 2300, and further preferably from 1520 to 2100. n in the formula (1) is an integer such that the number average molecular weight of the polyalkylene glycol satisfy the above condition. In the case where the number average molecular weight of the polyalkylene glycol is the above lower limit or more, the lubricity is enhanced under coexistence of a mildly flammable hydrofluorocarbon refrigerant. In the case where the number average molecular weight of the polyalkylene glycol is the above upper limit or less, the composition range which exhibits compatibility to the mildly flammable hydrofluorocarbon refrigerant becomes wider under low temperature conditions, and it is possible to suppress lubrication defects of a refrigerant compressor and inhibition of heat exchange in an evaporator.

In the polyalkylene glycol according to the present embodiment, the ratio of the weight average molecular weight (Mw) to the number average molecular weight (Mn) (Mw/Mn) is from 1.00 to 1.15, preferably from 1.00 to 1.14, more preferably from 1.00 to 1.13, and further preferably from 1.00 to 1.12. If Mw/Mn is 1.15 or less, it is possible to increase the flash point and the autoignition point of the polyalkylene glycol. If Mw/Mn is 1.15 or less, it is possible to ensure the compatibility between the mildly flammable hydrofluorocarbon refrigerant and the refrigerating machine oil. Mw/Mn can be 1.02 or more, 1.04 or more, 1.06 or more, or 1.08 or more, from the viewpoint of increasing the lubricity of the refrigerating machine oil. The weight average molecular weight (Mw) of the polyalkylene glycol according to the present embodiment is selected as appropriate such that Mn and Mw/Mn satisfy the above conditions.

The weight average molecular weight (Mw), the number average molecular weight (Mn), and the ratio of the weight average molecular weight (Mw) to the number average molecular weight (Mn) (Mw/Mn) in the present invention mean Mw, Mn, and Mw/Mn obtained by GPC analysis (values in terms of polypropylene glycol (standard sample)). It is possible to measure Mw, Mn, and Mw/Mn, for example, as follows.

Chloroform is used as the solvent, and dilution is conducted to prepare a solution of which sample concentration is 1% by mass. The sample solution is analyzed by using a GPC apparatus (Waters Alliance 2695). Analysis is conducted at a solvent flow rate of 1 ml/min by using a column of which analyzable molecular weight is from 100 to 10,000 with the refractive index as the detector. It should be noted that, after the relationship between the column retention time and the molecular weight by using a polypropylene glycol standard of which molecular weight is obvious is determined to thereby form a calibration curve separately, the molecular weight is determined from the obtained retention time.

It is preferred that the flash point of the polyalkylene glycol according to the present embodiment is 220° C. or more, it is more preferred that the flash point is 230° C. or more, and it is further preferred that the flash point is 240° C. or more. The flash point in the present invention means the flash point measured in compliance with JIS K2265-4: 2007 "Determination of flash points—Part4: Cleveland open cup method".

It is preferred that the autoignition point of the polyalkylene glycol according to the present embodiment is 330° C. or more, it is more preferred that the autoignition point is 340° C. or more, and it is further preferred that the autoignition point is 350° C. or more. The autoignition point in the present invention means the value measured by the method in compliance with ASTM E 659-1978.

The kinematic viscosity of the polyalkylene glycol according to the present embodiment at 100° C. is preferably from 4 to 30 mm$^2$/s, more preferably from 5 to 20 mm$^2$/s, further preferably from 6 to 18 mm$^2$/s, still further preferably from 7 to 16 mm$^2$/s, particularly preferably from 8 to 15 mm$^2$/s, and most preferably from 10 to 15 mm$^2$/s. If the kinematic viscosity at 100° C. is the above lower limit or more, the lubricity under coexistence of the refrigerant increases. If the kinematic viscosity is the above upper limit or less, the composition range which exhibits compatibility to the refrigerant becomes wider and it is possible to suppress lubrication defects of the refrigerant compressor and inhibition of heat exchange in the evaporator.

It is preferred that the kinematic viscosity of the polyalkylene glycol according to the present embodiment at 40° C. is from 10 to 200 mm$^2$/s, and it is more preferred that the kinematic viscosity is from 20 to 150 mm$^2$/s. If the kinematic viscosity at 40° C. is 10 mm$^2$/s or more, the lubricity and the sealability of the compressor tend to increase. If the kinematic viscosity is 200 mm$^2$/s or less, the composition range which exhibits compatibility to the refrigerant becomes wider under low temperature conditions, and it is possible to suppress lubrication defects of the refrigerant compressor and inhibition of heat exchange in the evaporator.

The kinematic viscosity in the present invention means the kinematic viscosity specified in JIS K-2283-1993.

It is preferred that the pour point of the polyalkylene glycol according to the present embodiment is −10° C. or less, and it is more preferred that the pour point is from −20 to −50° C. If a polyalkylene glycol of which pour point is −10° C. or less is used, it tends to be able to suppress the refrigerating machine oil in a refrigerant circulation system from solidifying at low temperatures. The pour point in the present invention means the pour point specified in JIS K2269-1987.

The hydroxy value of the polyalkylene glycol according to the present embodiment is, but not particularly limited to, preferably 100 mgKOH/g or less, more preferably 50 mgKOH/g or less, further preferably 30 mgKOH/g or less, and most preferably 10 mgKOH/g or less.

The polyalkylene glycol according to the present embodiment can be synthesized by using a known method (for example, see "Alkylene Oxide Polymers", Shibata, M. et al., Kaibundo, published on Nov. 20, 1990 (Hei 2)). For example, a polyalkylene glycol represented by the above formula (1) is obtained by subjecting an alcohol ($R^1OH$; $R^1$ represents the same definition as $R^1$ in the above formula (1)) to addition polymerization with one or more predetermined alkylene oxides and further etherifying or esterifying the terminal hydroxyl groups. In the case where two or more different alkylene oxides are used in the production step described above, the obtained polyalkylene glycol may be either a random copolymer or a block copolymer, but it is preferred to be a block copolymer from the point of tendency to more excel in oxidation stability, and it is preferred to be a random copolymer from the point of tendency to more excel in low temperature flowability.

In the production step of the polyalkylene glycol according to the present embodiment, there is a case where an alkylene oxide such as propylene oxide causes a side reaction to thereby form an unsaturated group such as an ally group in the molecule. If an unsaturated group is formed in a polyalkylene glycol molecule, phenomena, such as decreases in the thermal stability of the polyalkylene glycol itself, formation of sludge caused by formation of a polymerized product, or formation of a peroxide due to decreases in the anti-oxidative property (oxidation prevention property), are likely to occur. In particular, if a peroxide is formed, the peroxide is decomposed to form a compound having a carbonyl group, furthermore, the compound having a carbonyl group forms sludge, and clogging of a capillary is likely to occur.

Accordingly, as the polyalkylene glycol according to the present embodiment, those of which degree of unsaturation due to an unsaturated group and the like is low are preferred. Specifically, it is preferred that the degree of unsaturation is 0.04 meq/g or less, it is more preferred that the degree of unsaturation is 0.03 meq/g or less, and it is further preferred that the degree of unsaturation be 0.02 meq/g or less. It is preferred that the peroxide value be 10.0 meq/kg or less, it is more preferred that the peroxide value be 5.0 meq/kg or less, and it is further preferred that the peroxide value be 1.0 meq/kg. Furthermore, it is preferred that the carbonyl value is 100 ppm by weight or less, it is more preferred that the carbonyl value is 50 ppm by weight or less, and it is further preferred that the carbonyl value is 20 ppm by weight or less.

The degree of unsaturation, peroxide value and carbonyl value in the invention are the values measured each in accordance with the Standard Methods for the Analysis of Fats, Oils and Related Materials established by the Japan Oil Chemists' Society. That is, the degree of unsaturation in the present invention is a value (meq/g) obtained by reacting a Wijs solution (ICl-acetic acid solution) with a sample, leaving the reaction mixture to stand in a dark place, subsequently reducing the excess ICl to iodine, titrating the iodine portion with sodium thiosulfate to calculate the iodine value, and then converting the iodine value to vinyl equivalents (meq/g). The peroxide value in the present invention is a value (meq/kg) obtained by adding potassium iodide to a sample, titrating the produced free iodine with sodium thiosulfate, and converting the free iodine to milliequivalents with respect to 1 kg of sample. The carbonyl value in the present invention is a value (ppm by weight) obtained by allowing 2,4-dinitrophenylhydrazine to act on a sample to produce colorable quinoid ions, measuring the absorbance of this sample at 480 nm, and converting it to a carbonyl content based on a predetermined calibration curve with cinnamaldehyde as the standard substance.

In the present embodiment, in order to obtain a polyalkylene glycol of which degree of unsaturation, peroxide value and carbonyl value are low, it is preferred that the reaction temperature in allowing the alkylene oxide to react be 120° C. or less, and it is more preferred that the reaction temperature is 110° C. or less. If an alkali catalyst is used during production, it is possible to reduce the degree of unsaturation by using an inorganic adsorbent such as activated carbon, activated white earth, bentonite, dolomite, or aluminosilicate for removing the catalyst. It is possible to prevent the increase in the peroxide value or carbonyl value also by avoiding contact with oxygen as much as possible and by adding an antioxidant during production or use of the polyalkylene glycol.

The refrigerating machine oil of the present embodiment comprises the above polyalkylene glycol, and even in the case where the polyalkylene glycol is used singly, it is possible to enhance the safety for a refrigerating machine oil and a working fluid composition for a refrigerating machine containing the refrigerating machine oil, from the viewpoint of flame retardancy. However, base oils described below other than the above polyalkylene glycol and additives may be added as required.

The content of the above polyalkylene glycol in the refrigerating machine oil of the present embodiment is not particularly limited provided that the above excellent properties are not impaired, but, based on the total amount of the refrigerating machine oil, it is preferred the content is 50% by mass or more, it is more preferred that the content be 70% by mass or more, it is further preferred that the content be 80% by mass or more, and it is particularly preferred that the content be 90% by mass or more. If the content of the above polyalkylene glycol is 50% by mass or more, it is possible to enhance the safety of the refrigerating machine oil and the working fluid composition for a refrigerating machine containing the refrigerating machine oil.

As the base oil other than the polyalkylene glycol according to the present embodiment, it is possible to use hydrocarbon oils, such as mineral oils, olefin polymers, naphthalene compounds, and alkylbenzenes, and ester-based base oils (such as monoesters, diesters, and polyol esters), and oxygen-containing synthetic oils, such as polyglycols other than the polyalkylene glycol according to the present embodiment, polyvinyl ethers, ketones, polyphenyl ethers, silicones, polysiloxanes and perfluoroethers. As the oxygen-containing synthetic oil, polyol esters and polyvinyl ethers are preferably used.

The refrigerating machine oil and the working fluid composition for a refrigerating machine of the present embodiment can comprise conventionally-known additives for refrigerating machine oil as required, in order to further enhance their performance. Examples of such additives include antioxidants, acid scavengers, antiwear agents, extreme pressure agents, oiliness agents, antifoaming agents, metal deactivators, viscosity index improvers, pour point depressant, and detergent dispersants. One of these additives may be used singly, or two or more of these additives may be used in combination. The content of these additives is not particularly limited to, but it is preferably 10% by mass or less and further preferably 5% by mass or less, based on the total amount of the refrigerating machine oil.

The kinematic viscosity of the refrigerating machine oil of the present embodiment at 40° C. is not particularly limited to, but it is preferably from 3 to 1000 mm$^2$/s, more preferably from 4 to 500 mm$^2$/s, and further preferably from 5 to 400 mm$^2$/s. The kinematic viscosity of the refrigerating machine oil of the present embodiment at 100° C. is preferably from 1 to 100 mm$^2$/s and more preferably from 2 to 50 mm$^2$/s.

The moisture content of the refrigerating machine oil of the present embodiment is not particularly limited to, but it is preferably 500 ppm or less, more preferably 300 ppm or less, and further preferably 200 ppm or less, based on the total amount of the refrigerating machine oil. Particularly, in the case of being used for a hermetic refrigerating machine, it is required that the moisture content is low, from the viewpoint of the influence on thermal/chemical stability and the electrical insulation property of the refrigerating machine oil.

The acid value of the refrigerating machine oil of the present embodiment is not particularly limited to, but it is preferably 0.1 mgKOH/g or less and more preferably 0.05 mgKOH/g or less, in order to prevent corrosion of the metal used in the refrigerating machine or piping, and to prevent degradation of the ester contained in the refrigerating machine oil of the present embodiment. The acid value in the present invention means the acid value measured in compliance with JIS K2501: 2003 "Petroleum Products And Lubricating Oils-Neutralization Value Test Method".

The ash content of the refrigerating machine oil of the present embodiment is not particularly limited to, but it is preferably 100 ppm or less and more preferably 50 ppm or less, in order to increase the thermal/chemical stability of the refrigerating machine oil and to suppress the occurrence of sludge or the like. The ash content in the present invention means the value of the ash content measured in compliance with JIS K2272: 1998 "Crude Oil/Petroleum Product-Ash Content and Sulfated Ash Content Test Method".

The refrigerating machine oil of the present embodiment is used with a mildly flammable hydrofluorocarbon (HFC) refrigerant, and the working fluid composition for a refrigerating machine of the present embodiment comprises a mildly flammable hydrofluorocarbon (HFC) refrigerant. In the hydrofluorocarbon (HFC) refrigerant, saturated fluorinated hydrocarbon refrigerants (also referred to as hydrofluoroalkane refrigerants) and unsaturated fluorinated hydrocarbon refrigerants (also referred to as hydrofluoroalkene refrigerants, hydrofluoroolefin refrigerants, or HFO refrigerants) are included. The mildly flammable refrigerant in the present invention means refrigerants included in the A2L classification in the flammability classification of ASHRAE (The American Society of Heating, Refrigerating and Air-conditioning Engineers).

Examples of the mildly flammable hydrofluorocarbon refrigerant include difluoromethane (HFC-32), 1,3,3,3-tetrafluoropropene (HFC-1234ze), and 2,3,3,3-tetrafluoropropene (HFC-1234yf). As the mildly flammable hydrofluorocarbon refrigerant, 1,3,3,3-tetrafluoropropene (HFC-1234ze) or 2,3,3,3-tetrafluoropropene (HFC-1234yf) is preferred.

The refrigerant used with the refrigerating machine oil of the present embodiment may be a mixed refrigerant of a mildly flammable hydrofluorocarbon refrigerant and other refrigerant. Examples of other refrigerants include hydrofluorocarbon refrigerants other than mildly flammable hydrofluorocarbon refrigerants, fluorine-containing ether-based refrigerants such as perfluoroethers, bis(trifluoromethyl)sulfide refrigerants, trifluoromethyl iodide refrigerants, and natural refrigerants, such as dimethylether, carbon dioxide, ammonia, and hydrocarbons. As other refrigerants, refrigerants composed of a compound which does not have an oxygen atom are preferably used.

Examples of hydrofluorocarbon refrigerant other than the mildly flammable hydrofluorocarbon refrigerant include trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), 1,1,1,3,3-pentafluorobutane (HFC-365mfc), and 1,2,3,3,3-pentafluoropropene (HFC-1225ye).

As the hydrocarbon refrigerant, hydrocarbons having from 3 to 5 carbon atoms are preferred, and specifically, examples include methane, ethylene, ethane, propylene, propane, cyclopropane, normal butane, isobutane, cyclobutane, methylcyclopropane, 2-methylbutane, normal pentane, or mixtures of two or more of these. Of these, those which are gaseous at 25° C. and 1 atmosphere are preferably used, and propane, normal butane, isobutane, 2-methylbutane or a mixture of these is preferred.

Examples of the fluorine-containing ether-based refrigerant specifically include HFE-134p, HFE-245mc, HFE-236mf, HFE-236me, HFE-338mcf, HFE-365mcf, HFE-245mf, HFE-347mmy, HFE-347mcc, HFE-125, HFE-143m, HFE-134m, and HFE-227me, and these refrigerants are selected as appropriate depending on uses and the required performance.

In the case where the refrigerant of the present embodiment is a mixed refrigerant, it is preferred that the mixing ratio between the mildly flammable hydrofluorocarbon refrigerant and other refrigerant (mass ratio, mildly flammable hydrofluorocarbon refrigerant:other refrigerant) is 1:99 to 99:1, and it is more preferred that the mixing ratio is 5:95 to 95:5.

The refrigerating machine oil of the present embodiment is, usually in a refrigerating machine, present in the form of a single mildly flammable hydrofluorocarbon refrigerant or of a working fluid composition for refrigerating machine mixed with a mixed refrigerant. The mixing proportion of refrigerating machine oil and the refrigerant in the working fluid composition for a refrigerating machine of the present embodiment is not particularly limited to, but refrigerating machine oil is preferably from 1 to 500 parts by mass and more preferably from 2 to 400 parts by mass with respect to 100 parts by mass of the refrigerant.

The refrigerating machine of the present embodiment comprises at least a refrigerant circulation system comprising a refrigerant compressor, a gas cooler, an expansion mechanism, and an evaporator. Examples of the refrigerating machine include air conditioners for automobiles, dehumidifiers, a refrigerating machine, freezing-refrigerating warehouses, vending machines, showcases, cooling apparatus for chemical plants or the like, air conditioners for housing, package air conditioners, and heat pumps for supplying hot water.

FIG. 1 is a schematic view showing an example of the configuration of a refrigerating machine according to the present embodiment. As shown in FIG. 1, a refrigerating machine 10, for example, comprises at least a refrigerant circulation system in which a refrigerant compressor 1, a gas cooler 2, an expansion mechanism 3 (a capillary, an expansion valve and the like), and evaporator 4 are successively connected by a passage 5. In the refrigerant circulation system, first, a mildly flammable hydrofluorocarbon refrigerant (hereinafter, also simply referred to as "a refrigerant") at a high temperature (usually 70 to 120° C.) released from the refrigerant compressor 1 into the passage 5 becomes a high-density fluid (supercritical fluid or the like) in the gas cooler 2. Subsequently, the refrigerant passes through the narrow passage possessed by the expansion mechanism 3 to be liquefied, and is further vaporized in the evaporator 4 to have a lower temperature (usually −40 to 0° C.).

In refrigerant compressor 1 in FIG. 1, a small amount of the refrigerant and the large amount of the refrigerating machine oil coexist under a high temperature (usually 70 to 120° C.) condition. The refrigerant released from the refrigerant compressor 1 to the passage 5 is gaseous and contains a small amount of (usually 1 to 10%) the refrigerating machine oil as mist. In this misty refrigerating machine oil, a small amount of the refrigerant is dissolved (point a in FIG. 1). Next, in the gas cooler 2, the gaseous refrigerant is compressed to be a high-density fluid, and under a relatively high temperature (usually 50 to around 70° C.) condition, a large amount of the refrigerant and a small amount of the refrigerating machine oil coexist (point b in FIG. 1). Furthermore, the mixture of a large amount of the refrigerant and a small amount of the refrigerating machine oil is successively supplied to the expansion mechanism 3 and the evaporator 4 to rapidly have a lower temperature (usually −40 to 0° C.) (points c and d in FIG. 1) and be returned back to the refrigerant compressor 1.

By using a composition comprising the polyalkylene glycol according to the present embodiment as the refrigerating machine oil, it becomes possible to flame-retard the a refrigerating machine in which a mildly flammable hydrofluorocarbon refrigerant as mentioned above is used.

The refrigerating machine oil and the working fluid composition for a refrigerating machine of the present embodiment are preferably used in air conditioners or a refrigerating machine having a reciprocating or rotating closed compressor, or in open or closed automobile air conditioners. The refrigerating machine oil and the working fluid composition for a refrigerating machine of the present embodiment are preferably used in cooling apparatuses, such as dehumidifiers, hot water suppliers, freezers, freezing-refrigerating warehouses, vending machines, showcases, chemical plants and the like. The refrigerating machine oil and the working fluid composition for a refrigerating machine of the present embodiment are preferably used in those having a centrifugal compressor.

EXAMPLES

Hereinafter, the present invention is described more specifically based on examples and comparative examples, but the present invention is not in any way limited by the examples below.

Examples 1 to 4 and Comparative Examples 1 to 6

In Examples 1 to 4 and Comparative Examples 1 to 6, base oils 1 to 10 shown below were each used to prepare a refrigerating machine oil.

(Base Oil)
Base Oil 1:
Me-O—(PO)$_n$-Me
[number average molecular weight Mn: 800, ratio of the weight average molecular weight (Mw) to the number average molecular weight (Mn) (Mw/Mn): 1.08, ratio of the oxyethylene group in the total oxyalkylene groups: 0 mol %]
Base Oil 2:
Me-O-(EO,PO)$_n$-Me
[number average molecular weight Mn: 800, ratio of the weight average molecular weight (Mw) to the number average molecular weight (Mn) (Mw/Mn): 1.17, ratio of the oxyethylene group in the total oxyalkylene groups: 10 mol %]
Base Oil 3:
Me-O—(PO)$_n$-Me
[number average molecular weight Mn: 1500, ratio of the weight average molecular weight (Mw) to the number average molecular weight (Mn) (Mw/Mn): 1.10, ratio of the oxyethylene group in the total oxyalkylene groups: 0 mol %]
Base Oil 4:
Me-O-(EO,PO)$_n$-Me
[number average molecular weight Mn: 1500, ratio of the weight average molecular weight (Mw) to the number average molecular weight (Mn) (Mw/Mn): 1.05, ratio of the oxyethylene group in the total oxyalkylene groups: 30 mol %]
Base Oil 5:
Me-O—(PO)$_n$-Me
[number average molecular weight Mn: 1500, ratio of the weight average molecular weight (Mw) to the number average molecular weight (Mn) (Mw/Mn): 1.18, ratio of the oxyethylene group in the total oxyalkylene groups: 0 mol %]
Base Oil 6:
Me-O-(EO,PO)$_n$-Me
[number average molecular weight Mn: 1500, ratio of the weight average molecular weight (Mw) to the number average molecular weight (Mn) (Mw/Mn): 1.21, ratio of the oxyethylene group in the total oxyalkylene groups: 40 mol %]
Base Oil 7:
Ac—O—(PO)$_n$—Ac
[number average molecular weight Mn: 1000, ratio of the weight average molecular weight (Mw) to the number average molecular weight (Mn) (Mw/Mn): 1.13, ratio of the oxyethylene group in the total oxyalkylene groups: 0 mol %]
Base Oil 8:
Me-O—(PO)$_n$-Me
[number average molecular weight Mn: 400, ratio of the weight average molecular weight (Mw) to the number average molecular weight (Mn) (Mw/Mn): 1.12, ratio of the oxyethylene group in the total oxyalkylene groups: 0 mol %]
Base Oil 9:
Me-O—(PO)$_n$-Me
[number average molecular weight Mn: 2300, ratio of the weight average molecular weight (Mw) to the number average molecular weight (Mn) (Mw/Mn): 1.14, ratio of the oxyethylene group in the total oxyalkylene groups: 0 mol %]
Base Oil 10:
Me-O-(EO,PO)$_n$-Me
[number average molecular weight Mn: 2700, ratio of the weight average molecular weight (Mw) to the number average molecular weight (Mn) (Mw/Mn): 1.27, ratio of the oxyethylene group in the total oxyalkylene groups: 30 mol %]

In the base oils 1 to 10, Me represents a methyl group, Ac represents an acetyl group, EO represents an oxyethylene group, and PO represents a propylene group.

Next, on each refrigerating machine oil of Examples 1 to 4 and Comparative Examples 1 to 6, evaluations shown below were performed.
(Evaluation of Various Properties)
Various properties of the refrigerating machine oils were evaluated in compliance with test methods shown below.
Kinematic viscosity: JIS K2283-1993
Pour point: JIS K2269-1987
Flash point: JIS K2265-4: 2007
Autoignition point: ASTM E 659-1978
(Refrigerant Compatibility Evaluation)
In compliance with JIS-K2211: 2009 "Refrigerating machine oils" and "Refrigerant compatibility test method", 2 g of the refrigerating machine oil was added to 18 g of 2,3,3,3-tetrafluoropropene (HFC-1234yf) to observe whether the refrigerant and the refrigerating machine oil were dissolved in each other at 0° C. The results obtained are shown in Tables 1 to 2. In the tables, "compatible" means that the refrigerant and the refrigerating machine oil were dissolved in each other, and "separated" means that the refrigerant and the refrigerating machine oil were separated into two layers.

TABLE 1

|  | Example 1 | Example 2 | Example 3 | Example 4 |
|---|---|---|---|---|
| Base oil No. | 3 | 4 | 7 | 9 |
| Mn | 1500 | 1500 | 1000 | 2300 |

TABLE 1-continued

|  |  | Example 1 | Example 2 | Example 3 | Example 4 |
|---|---|---|---|---|---|
| Mw/Mn |  | 1.10 | 1.05 | 1.13 | 1.14 |
| EO ratio [mol %] |  | 0 | 30 | 0 | 0 |
| Refrigerant |  | HFC-1234yf | HFC-1234yf | HFC-1234yf | HFC-1234yf |
| Kinematic viscosity [mm²/s] | 40° C. | 73 | 71 | 50 | 138 |
|  | 100° C. | 15 | 15 | 10 | 25 |
| Pour point [° C.] |  | <−45 | <−45 | <−45 | <−45 |
| Compatibility |  | Compatible | Compatible | Compatible | Compatible |
| Flash point [° C.] |  | 230 | 239 | 225 | 237 |
| Autoignition point [° C.] |  | 378 | 389 | 361 | 367 |

TABLE 2

|  |  | Comp. Example 1 | Comp. Example 2 | Comp. Example 3 | Comp. Example 4 | Comp. Example 5 | Comp. Example 6 |
|---|---|---|---|---|---|---|---|
| Base oil No. |  | 1 | 2 | 5 | 6 | 8 | 10 |
| Mn |  | 800 | 800 | 1500 | 1500 | 400 | 2700 |
| Mw/Mn |  | 1.08 | 1.17 | 1.18 | 1.21 | 1.12 | 1.27 |
| EO ratio [mol %] |  | 0 | 10 | 0 | 40 | 0 | 30 |
| Refrigerant |  | HFC-1234yf | HFC-1234yf | HFC-1234yf | HFC-1234yf | HFC-1234yf | HFC-1234yf |
| Kinematic viscosity [mm²/s] | 40° C. | 45 | 44 | 72 | 70 | 15 | 160 |
|  | 100° C. | 10 | 10 | 15 | 15 | 4 | 30 |
| Pour point [° C.] |  | <−45 | <−45 | <−45 | <−45 | <−45 | −35 |
| Compatibility |  | Compatible | Compatible | Compatible | Compatible | Compatible | Separated |
| Flash point [° C.] |  | 209 | 203 | 212 | 211 | 191 | 218 |
| Autoignition point [° C.] |  | 345 | 339 | 347 | 349 | 318 | 355 |

In the case where the refrigerating machine oils of Examples 1 to 4 are used with a mildly flammable hydrofluorocarbon refrigerant in a refrigerating machine, flame-retarding is enabled.

REFERENCE SIGNS LIST

1 . . . refrigerant compressor, 2 . . . gas cooler, 3 . . . expansion mechanism, 4 . . . evaporator, 5 . . . passage, 10 . . . refrigerating machine.

The invention claimed is:

1. A refrigerating machine oil comprising a polyalkylene glycol represented by the following formula (1):

$$R^1\text{—}(OR^3)_n\text{—}OR^2 \qquad (1)$$

wherein $R^1$ and $R^2$ may be the same or different from each other and each represents a hydrogen atom, an alkyl group having from 1 to 5 carbon atoms, or an acyl group having from 2 to 5 carbon atoms, $R^3$ represents an alkylene group having from 2 to 4 carbon atoms, n represents an integer such that a number average molecular weight of the polyalkylene glycol represented by the formula (1) is from 1500 to 2500;

the polyalkylene glycol having a ratio of a weight average molecular weight Mw to the number average molecular weight Mn, Mw/Mn, of from 1.04 to 1.15, wherein a ratio of an ethylene group in the alkylene groups represented by $R^3$ in the polyalkylene glycol represented by the formula (1) is 30 mol % or less;

wherein a flash point of the polyalkylene glycol is 220° C. or more and an autoignition point of the polyalkylene glycol is 330° C. or more.

2. The refrigerating machine oil according to claim 1, wherein $R^1$ and $R^2$ represent a methyl group.

3. A working fluid composition for a refrigerating machine, comprising:
   the refrigerating machine oil according to claim 1 and
   a refrigerant consisting of a mildly flammable hydrofluorocarbon that is at least one selected from the group consisting of difluoromethane, 1,3,3,3-tetrafluoropropene, and 2,3,3,3-tetrafluoropropene.

4. The working fluid composition for a refrigerating machine according to claim 3, wherein $R^1$ and $R^2$ represent a methyl group and $R^3$ represents a propylene group.

* * * * *